No. 678,233. Patented July 9, 1901.
A. R. EVEREST.
FLUX SCREEN FOR TRANSFORMERS.
(Application filed Mar. 4, 1899.)
(No Model.) 2 Sheets—Sheet 2.
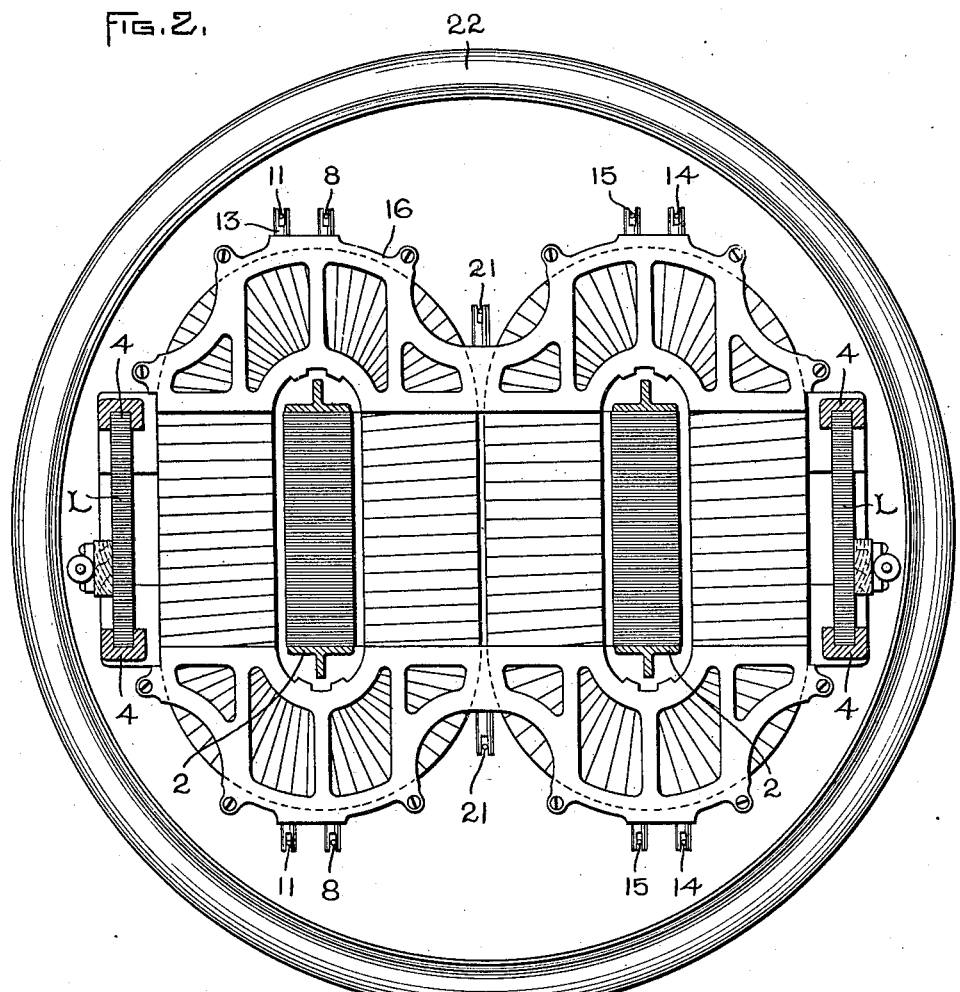
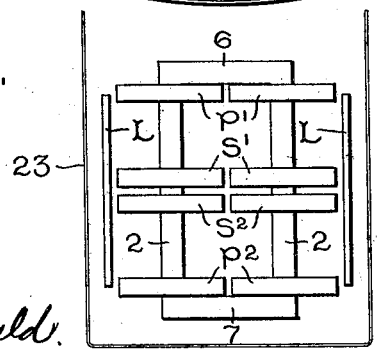
WITNESSES.
A. H. Abell.
A. F. Macdonald.
INVENTOR.
Augustine R. Everest,
by Albert G. Davis
Atty.

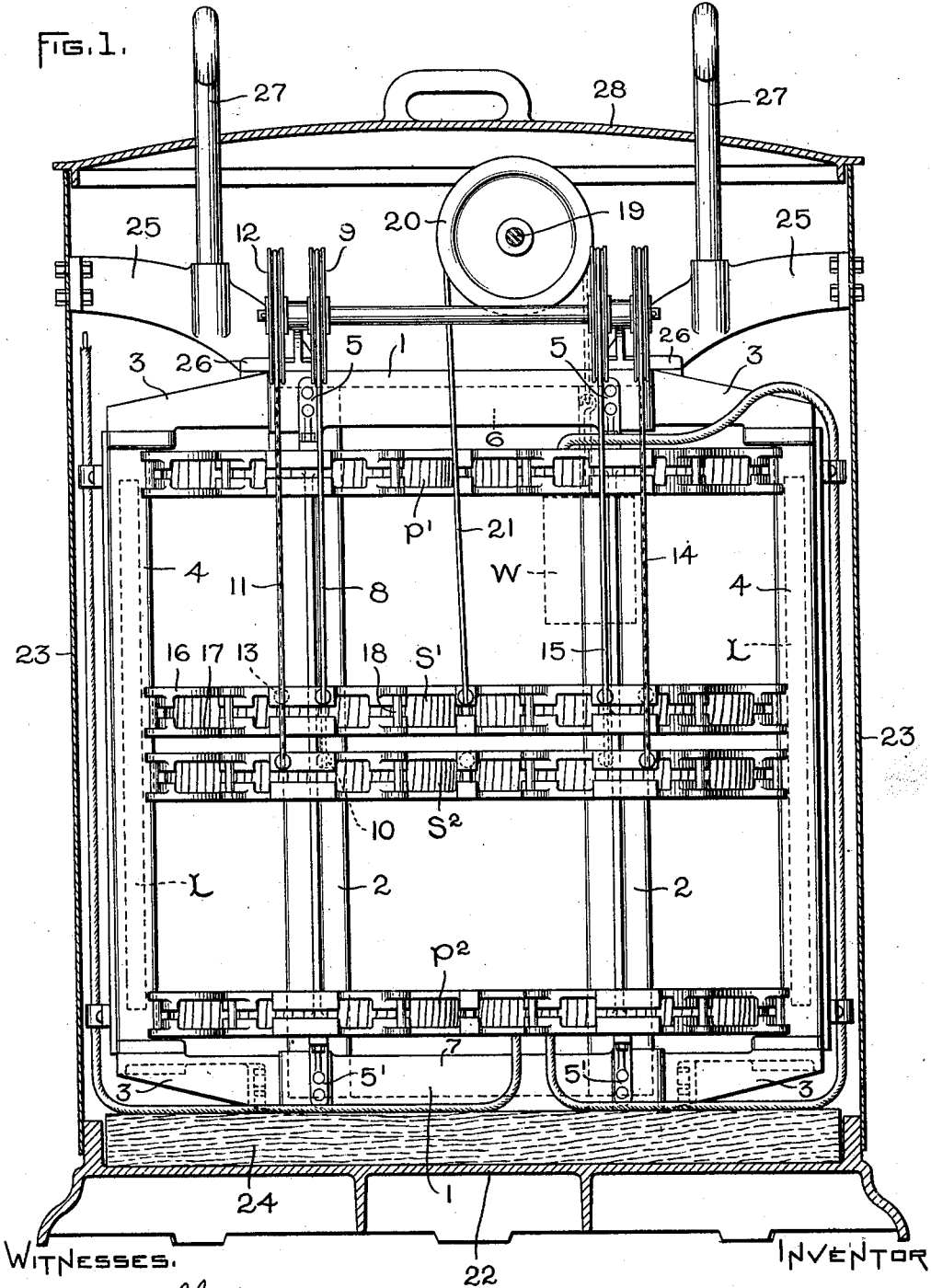

UNITED STATES PATENT OFFICE.

AUGUSTINE R. EVEREST, OF LYNN, MASSACHUSETTS, ASSIGNOR TO THE GENERAL ELECTRIC COMPANY, OF NEW YORK.

FLUX-SCREEN FOR TRANSFORMERS.

SPECIFICATION forming part of Letters Patent No. 678,233, dated July 9, 1901.

Application filed March 4, 1899. Serial No. 707,722. (No model.)

*To all whom it may concern:*

Be it known that I, AUGUSTINE R. EVEREST, a subject of the Queen of Great Britain, residing at Lynn, county of Essex, State of Massachusetts, have invented certain new and useful Improvements in Flux-Screens for Transformers, (Case No. 1,104,) of which the following is a specification.

In operating alternating-current transformers in practice it is customary to inclose the transformer proper in a metallic shield or casing, the object of the latter being for protection against the weather as well as against mechanical injury and other causes liable to interfere with the operation of the apparatus. In such cases it is possible for a part of the leakage flux of the transformer to find a return path through the casing, and thus by producing changes in the number of lines of force threading through the casing to cause the generation of eddy-currents therein and consequent waste of energy. This effect may generally be neglected in the case of well-designed constant-potential transformers, since the mutual induction of the primary and secondary windings is very high and the leakage flux therefore very small. In the case of constant-current transformers, however, the conditions are very different. The principle of operation of a transformer of this kind is dependent upon the variation of leakage flux between no load and full load. At full load the greatest difference of potential is required in the secondary circuit. The greatest number of lines of force from the primary then thread through the secondary windings, and the leakage flux is a minimum, while at small loads a proportionally smaller number of lines of force thread through the secondary, and a correspondingly greater leakage flux or stray field is produced. If the metallic casing of the transformer be in sufficiently close proximity, a large portion of this leakage flux will pass through it, thereby giving rise to wasteful eddy-currents, already referred to. I have found that this waste of energy may be prevented by interposing in the path of the leakage flux a shield or screen of laminated iron. The iron makes a shorter and better conducting-path for the leakage flux than the casing of the transformer, and thus prevents the flux from intersecting the casing. The laminations of the shield or flux screen are arranged in such a direction as practically to prevent the production of wasteful eddy-currents therein.

My invention relates to means for preventing waste of energy due to leakage flux, as briefly outlined above, and to certain arrangements of parts and details of construction, all of which will hereinafter be fully described and claimed.

Figure 1 is a view in elevation of a transformer embodying my invention. Fig. 2 is a plan view of the same, and Fig. 3 is an explanatory diagram.

The transformer which I have illustrated as embodying my invention is of the constant-current type, the laminated core of which is made in the form of a hollow rectangle or shell with primary and secondary coils $P'$ $P^2$ and $S'$ $S^2$, respectively, arranged on two opposite sides or legs of the core. As constructed in practice the core is formed of suitably-laminated iron, the laminæ being confined in position by means of end plates and clamping-bars. In Fig. 1 the end plates are illustrated at 1 and are substantially box-like in form, with one side open. The clamping-plates between which the vertically-arranged laminæ are held are shown at 2, the construction being best understood from the sectional view in Fig. 2. The ends of the vertical laminæ are intermingled in the usual way with the ends of the laminæ arranged in the horizontal end pieces—that is to say, first a vertical lamina projects into the corner of the end piece and then a horizontal lamina, the construction being such as to break joint in the ordinary manner. Brackets 3 of gun-metal or other non-magnetic material are bolted or otherwise secured to the end pieces 1. These brackets serve as a support for grooved standards 4, arranged with the grooves facing each other, as is clearly shown in Fig. 2. A flat structure or laminated plate of iron L is confined between and supported by the grooved standards 4. The plane of the laminæ is parallel to the plane of the leakage-flux, and consequently prevents almost entirely the production of eddy-currents. At the same time, however, the lines of force find a good return-circuit lengthwise of the laminæ and are therefore prevented from passing through and intersecting the casing 23. In order to prevent lateral displacement of the laminæ, suitable clamping-bolts are passed through holes in the laminæ.

Fig. 3 illustrates diagrammatically the arrangement of the core of the transformer with respect to its coils, flux-screen, and protecting-casing. This figure illustrates, perhaps better than the other figures of the drawings, the theory upon which the apparatus is based. It will be noted that any leakage flux or stray field which may escape outwardly from between the primary and secondary coils $P'$ $S'$, respectively, and from between the primary and secondary coils $P^2$ $S^2$, respectively, will be intercepted by the flux-screen L, interposed between the transformer and its casing 23.

The transformer is provided with two sets of primary coils $P'$ $P^2$. The coils of the set $P'$ are supported from brackets 5 and held in as close proximity as possible to the cross-bar 6 of the core of the transformer. The corresponding primary coil $P^2$ is supported in a similar manner from the brackets $5'$, the coil being practically in contact with the cross-bar 7 of the transformer, except for insulation placed between the parts. These primary coils are formed in sections, one section of one of the coils being placed about one leg 2 of the transformer-core and the other section about the other leg 2 of the core. The secondary coils $S'$ $S^2$ are formed in a manner similar to the primary coils, but are arranged so as to be movable relatively thereto. In order to conveniently secure this relative motion, the coils are balanced against each other by means of suitable flexible connections passing over pulleys or other transmitting devices. As shown in the drawings, the coil $S'$ is at one end connected to the cord 8, which passes up over the pulley 9, then across and over a similar pulley, (not shown in the drawings,) and then down on the other side of the transformer, and is connected, as shown in dotted lines at 10, to the transformer-coil $S^2$. In a similar manner the coil $S^2$ is connected to the cord 11, which passes over a pulley 12, then over another pulley, and down on the other side of the transformer to a connection on the coil $S'$, (indicated in dotted lines at 13.) The opposite ends of the coils $S'$ $S^2$ are connected together by cords 14 15 in a manner similar to that described. By this arrangement it will be noted that when the coil $S'$ moves upward the coil $S^2$ moves in the opposite direction, and vice versa.

In some cases the sections of the secondary coils may be arranged to move independently of each other; but I have in general found it more desirable to prevent this independence of movement, and I accomplish this result by suitably clamping or securing the sections of the secondary coil together. The means which I have provided for the purpose consists of clamping-plates 16 and 17, a plate being placed over each end of both coils and a corresponding plate on the opposite sides of the ends of the coils. Clamping-bolts 18 are passed through projecting lugs of the clamping-plates and serve to compress the sections between the plates. I find it convenient to apply this construction to all of the coils, whether fixed or movable. Although a minor point, it should be noted that these clamping-plates are made of a skeleton form, both in order to secure lightness and economy of material and to prevent as far as possible the production of eddy-currents therein.

The counterbalancing arrangement already described does not provide for the effect of repulsion between the primary and secondary coils due to current passing therein. If no further counterbalancing means were provided, the smallest amount of current in the primary coils would cause the corresponding secondary coils to move away therefrom the maximum distance allowed by the mechanical connections. In order to prevent this motion commencing until the current in the secondary coils has reached the value desired, I provide means for forcing the secondary coils into contact with their primary coils. The device used for this purpose consists of a weight W, which is arranged outside of the casing of the transformer and suspended from a cord which passes over a pulley (not shown) on the shaft 19. A second pulley 20 on this shaft has wound thereon a cord 21, one end of which is secured to the secondary coil $S'$. By choosing a suitable weight W or by otherwise varying the pull exerted by the cord 21 the current in the secondary coil may be maintained at any particular constant value, depending, within limits, upon the tension exerted upon this cord.

The transformer as a whole is placed within a protecting casing or tank, the bottom of which is formed, preferably, of a casting 22, to which the shell 23 of the casing or tank is secured by rivets or otherwise. It is desirable that the transformer should not be placed in too close proximity to the iron casing, and for this purpose a block of wood or other insulating or non-magnetic material 24 is placed between the transformer-core and the base 22 of the casing.

Brackets 25 are provided for securing the transformer in position in the casing. One end of each of these brackets is bolted to the shell 23, while the other end is similarly secured to the transformer at 26. Eyebolts 27 are fastened to the brackets 25 and serve as points of engagement in lifting the transformer. A removable cover 28 is placed over the casing.

In the normal operation of the transformer I find it desirable to fill the casing with oil, among the objects of which are the securing of good insulation, the dissipation of heat generated in the coils, and the damping action exerted upon the movable coils, the latter action serving to prevent any sudden movements, and consequently great variations in the electromotive forces generated in the coils.

I have shown the primary coils as connected in series, and the secondary coils likewise are so connected but for convenience of illustration the connections of the latter are not shown. It is evident, however, that any other arrangement of connections is well within my invention. For example, it is perfectly feasible to connect all of the primary coils in parallel or in series multiple, as desired. The connections for the secondary coils may be modified in a similar manner.

Although I have spoken of the secondary coils as being movable relatively to the fixed primary coils, it is quite evident that the secondary coils may be fixed and the primary coils arranged to move, or both may move simultaneously.

Having thus described my invention, what I claim as new, and desire to secure by Letters Patent of the United States, is—

1. The combination with an electromagnetic apparatus which in normal operation gives rise to a leakage or stray field of varying intensity, of a casing inclosing said apparatus, and a flux screen or shield interposed between the apparatus and its inclosing casing.

2. The combination with an electromagnetic apparatus which in normal operation gives rise to a stray field of varying intensity, of a casing inclosing said apparatus, and a flux screen or shield of laminated magnetic material interposed between the apparatus and the inclosing casing.

3. The combination with an electromagnetic apparatus which in normal operation gives rise to a leakage or stray field, of a flux screen or shield of laminated magnetic material interposed in the path of the leakage or stray field with the plane of the laminæ arranged at right angles to the direction of the currents which tend to be set up in said flux-screen by variations in the leakage or stray field.

4. The combination of a transformer having fixed and movable coils embracing a core of magnetic material, and a flux-screen of laminated magnetic material maintained in fixed relation to said core and arranged to intercept the stray field of the transformer.

5. The combination with a transformer having fixed and movable coils, of a flux-screen consisting of a body of laminated magnetic material arranged in a plane at right angles to the plane of the coils.

6. The combination of a transformer, a casing therefor and a body of magnetic material interposed between the transformer and casing so as to intercept the leakage field of the transformer.

7. The combination of a transformer, a casing therefor and a body of laminated magnetic material interposed between the transformer and its casing so as to intercept the leakage field of the transformer.

8. The combination of a transformer having fixed and movable coils embracing a core of magnetic material and a flux-screen of laminated material arranged to intercept the stray field of the transformer.

In witness whereof I have hereunto set my hand this 28th day of February, 1899.

AUGUSTINE R. EVEREST.

Witnesses:
    ALEX F. MACDONALD,
    DUGALD MCKILLOP.